(12) United States Patent
Matsumoto

(10) Patent No.: US 7,460,780 B2
(45) Date of Patent: Dec. 2, 2008

(54) SYSTEM AND METHOD FOR IMAGE CAPTURING

(75) Inventor: Kazuya Matsumoto, Ama (JP)

(73) Assignee: Winbond Electronics Corporation (TW)

( * ) Notice: Subject to any disclaimer, the term of this patent is extended or adjusted under 35 U.S.C. 154(b) by 0 days.

(21) Appl. No.: 12/043,422

(22) Filed: Mar. 6, 2008

(65) Prior Publication Data

US 2008/0212956 A1 Sep. 4, 2008

Related U.S. Application Data

(62) Division of application No. 11/288,032, filed on Nov. 28, 2005.

(30) Foreign Application Priority Data

| Mar. 15, 2005 | (JP) | ............................ 2005-073338 |
| Mar. 15, 2005 | (JP) | ............................ 2005-073339 |
| Mar. 15, 2005 | (JP) | ............................ 2005-073340 |

(51) Int. Cl.
*G03B 7/00* (2006.01)
*H04N 9/73* (2006.01)

(52) U.S. Cl. .................. 396/225; 348/223.1; 348/297

(58) Field of Classification Search .................. 396/77, 396/79, 80, 82, 125, 127, 180, 225; 348/63, 348/297, 216.1, 217.1, 345, 347, 349, 353, 348/355, 356, 364, 365, 223.1; 250/201.7; 327/60

See application file for complete search history.

(56) References Cited

U.S. PATENT DOCUMENTS

| 4,928,170 | A | 5/1990 | Soloveychik et al. .......... 358/94 |
| 5,235,428 | A | 8/1993 | Hirota et al. ................ 358/227 |
| 5,319,449 | A | 6/1994 | Saito et al. .................. 348/223 |
| 5,874,994 | A | 2/1999 | Xie et al. ..................... 348/349 |
| 6,094,537 | A | 7/2000 | Okazaki et al. ............. 396/127 |
| 6,430,368 | B1 | 8/2002 | Hata ............................ 396/79 |
| 6,470,148 | B2 | 10/2002 | Ide et al. ........................ 396/80 |
| 6,943,837 | B1 * | 9/2005 | Booth, Jr. ..................... 348/297 |
| 2003/0223009 | A1 | 12/2003 | Yoshida et al. ............... 348/349 |

* cited by examiner

*Primary Examiner*—Melissa Jan Koval
(74) *Attorney, Agent, or Firm*—Fish & Richardson P.C.

(57) ABSTRACT

An exposure parameter is determined based on an illumination condition by calculating a red divided by green (R/G) value, calculating a blue divided by green (B/G) value, and comparing the R/G and B/G values to a predetermined auto-white balancing map to determine the exposure parameter.

12 Claims, 9 Drawing Sheets

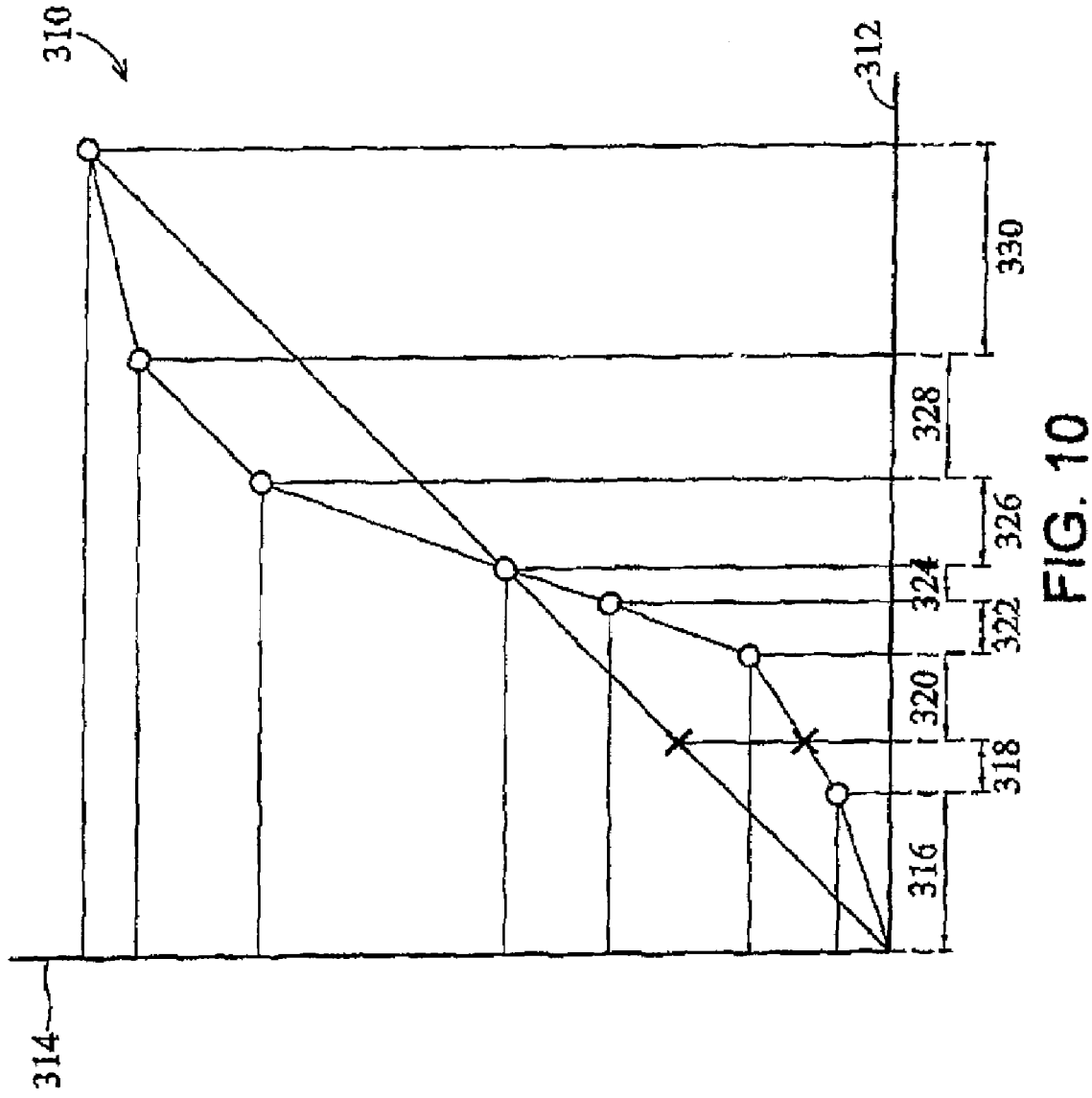

| -1 | -1 | -1 |
|----|----|----|
| -1 | 8  | -1 |
| -1 | -1 | -1 |

FIG. 11

| 1 | 0 | -1 |
|---|---|----|
| 1 | 0 | -1 |
| 1 | 0 | -1 |

FIG. 12

| 1  | 1  | 1  |
|----|----|----|
| 0  | 0  | 0  |
| -1 | -1 | -1 |

FIG. 13

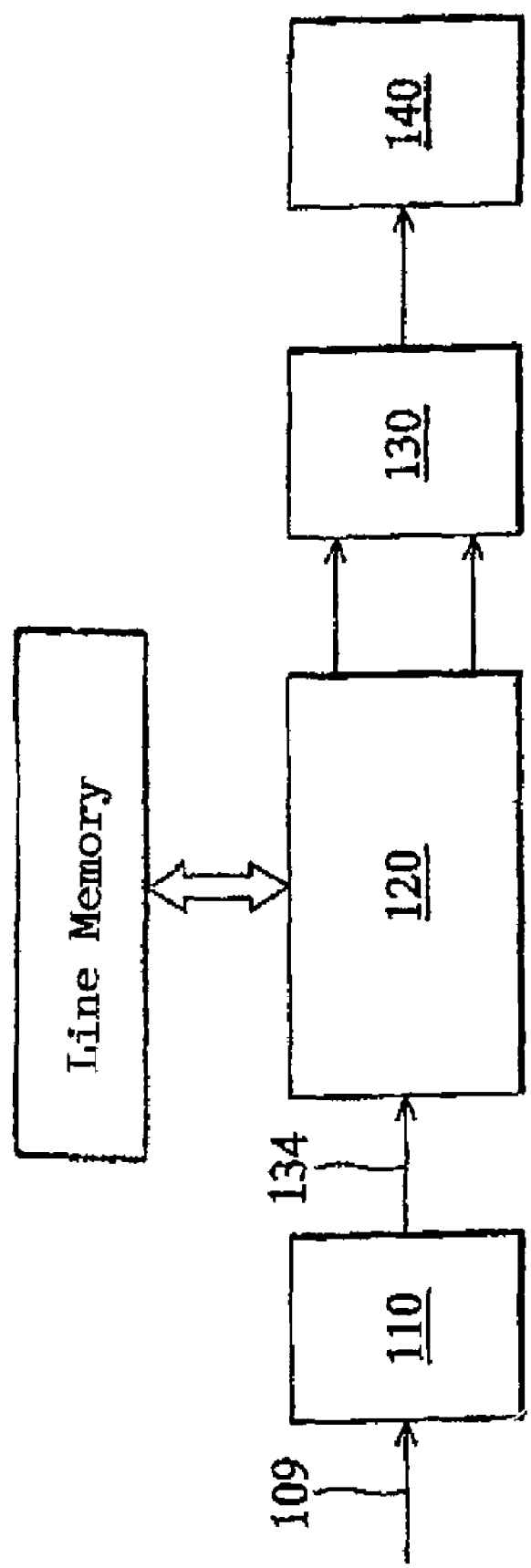

SYSTEM AND METHOD FOR IMAGE CAPTURING

CROSS REFERENCE TO RELATED APPLICATIONS

This application is a divisional application of and claims priority to U.S. Ser. No. 11/288,032, filed on Nov. 28, 2005 which claims priority from Japanese Application Ser. No. 2005-73339, filed on Mar. 15, 2005, Japanese Application Ser. No. 2005-73340, filed on Mar. 15, 2005, and Japanese Application Ser. No. 2005-73338, filed on Mar. 15, 2005. The contents of the above applications are herein incorporated by reference.

BACKGROUND

Image capturing systems such as video camera systems and still camera systems often include circuitry to enable auto-focusing of an image. Auto-focusing systems often include a combination of photo-sensors and signal processing circuits. Based on signals received from the photo-sensors, the signal processing circuits can determine various settings for the image capturing system.

SUMMARY

According to an aspect of the present invention, a method for auto-focusing in an image-capturing system includes sampling output signals from an auto-focusing circuit in a first interval of lens distances and determining a first lens distance and a second lens distance corresponding to the two highest values of the sampled output signals in the first interval of lens distances. The method also includes sampling output signals from the auto-focusing circuit in a second interval between the first lens distance and the second lens distance.

Embodiments can include one or more of the following.

The method can include determining a lens distance corresponding to the maximum value of the sampled output signals in the second interval and setting the focus position to the determined lens distance. The second interval can be smaller than the first interval. The first interval can include a first set of lens positions having a first distance between each of the lens positions and the second interval includes a second set of lens positions having a second distance between each of the lens positions. The second distance can be smaller than the first distance.

The method can also include performing signal processing can include performing pre-gamma correction according to predetermined function type, spatially filtering the image signals, weighting and integrating the filtered signals, and outputting the weighted and integrated signals as auto-focusing signals. The method can also include determining a third lens distance and a fourth lens distance corresponding to the two highest values of the sampled output signals in the second interval of lens distances, sampling output signals from the auto-focusing circuit in a third interval between the third lens distance and the fourth lens distance, determining a lens distance corresponding to the maximum value of the sampled output signals in the third interval, and setting the focus position to the determined lens distance.

According to an aspect of the present invention, an image-capturing system can include a focus lens and an auto-focusing circuit. The auto-focusing circuit can be configured to sample output signals from in a first interval of lens distances and determine a first lens distance and a second lens distance corresponding to the two highest values of the sampled output signals in the first interval of lens distances. The auto-focusing circuit can also be configured to sample output signals in a second interval between the first lens distance and the second lens distance, the second interval being smaller than the first interval.

Embodiments can include one or more of the following.

The auto-focusing circuit can be further configured to determine a lens distance corresponding to the maximum value of the sampled output signals in the second interval and set the focus position to the determined lens distance. The image-capturing can also include a signal processing circuit. The signal processing circuit can be configured to perform pre-gamma correction according to predetermined function type, spatially filter the image signals, weight and integrate the filtered signals, and output the weighted and integrated signals as auto-focusing signals to the auto-focusing circuit.

According to an aspect of the present invention, a method for determining an exposure parameter based on an illumination condition includes calculating a red divided by green (R/G) value, calculating a blue divided by green (B/G) value, and comparing the R/G and B/G values to a predetermined auto-white balancing map to determine an exposure parameter.

Embodiments can include one or more of the following.

The method can also include selecting a red signal, a blue signal, a first green signal, and a second green signal in a predetermined area of an imaging device. The predetermined area can include four adjacent pixels. Calculating the R/G value can include determining a first 1/G value based on the first green signal and multiplying the red signal by the first 1/G value. Calculating the B/G value can include determining a second 1/G value based on the second green signal and multiplying the blue signal by the second 1/G value.

The auto-white balancing map can include a plurality of regions corresponding the different illumination conditions. The auto-white balancing map can include a region corresponding to fluorescent lamp illumination. The method can also include generating a flicker correction signal based on the determined exposure parameter if the R/G and B/G values correspond to the region corresponding to fluorescent lamp illumination. The exposure parameter can be a shutter speed.

Calculating the R/G value and calculating the B/G value can include selecting a red signal, a blue signal, a first green signal, and a second green signal in a plurality of predetermined areas of an imaging device, calculating a plurality of intermediate R/G values and intermediate B/G values based on the selected red signal, the selected blue signal, the selected first green signal, and the selected second green signal in the plurality of predetermined areas, averaging the calculated intermediate R/G values to generate the R/G value, and averaging the calculated intermediate B/G values to generate the B/G value.

According to an aspect of the present invention, an image-capturing system can include a circuit configured to calculate a red divided by green (R/G) value, calculate a blue divided by green (B/G) value, and compare the R/G and B/G values to a predetermined auto-white balancing map to determine an exposure parameter.

Embodiments can include one or more of the following.

The auto-white balancing map can include a plurality of regions corresponding the different illumination conditions. The auto-white balancing map can include a region corresponding to fluorescent lamp illumination and the circuit if further configured to generate a flicker correction signal based on the determined exposure parameter if the R/G and B/G values correspond to the region corresponding to fluorescent lamp illumination.

According to an aspect of the present invention, a method includes providing a pre-gamma function having a first region, a second region, and a third region, the derivative of the function in the second region being greater than the derivative of the function in the first and third regions. The method also includes receiving image signals from a predetermined number of locations on an imaging device and performing pre-gamma correction on the received image signals using the pre-gamma function to generate a pre-gamma corrected image signal.

Embodiments can include one or more of the following.

Performing pre-gamma correction on the received image signals can include multiplying the received image signals by the derivative of the pre-gamma function in a region of the pre-gamma function corresponding to an illumination level of the received signal. The he image signals can correspond to the image signals for a plurality of green pixels. The pre-gamma function can be an approximately s-shaped function. The method can also include performing signal processing on the pre-gamma corrected signal. Performing signal processing on the pre-gamma corrected signal can include spatially filtering the image signals, weighting and integrating the filtered signals, and outputting the weighted and integrated signals as auto-focusing signals. Spatially filtering the image signals can include spatially filtering the image signals using Lapracian filtering or differential filtering.

According to an aspect of the present invention, an image-capturing system includes a circuit configured to provide a pre-gamma function having a first region, a second region, and a third region, the derivative of the function in the second region being greater than the derivative of the function in the first and third regions, receive image signals from a predetermined number of locations on an imaging device, and perform pre-gamma correction on the received image signals by multiplying the received image signals by the derivative of the pre-gamma function in a region of the pre-gamma function corresponding to an illumination level of the received signal using the pre-gamma function to generate a pre-gamma corrected image signal.

Embodiments can include one or more of the following.

The pre-gamma function can be an approximately s-shaped function.

In some embodiments, performing multi-sampling can provide higher auto-focusing accuracy and/or can reduce the probability of selecting an undesired signal peak during the auto focus process.

In some embodiments, performing multi-sampling can reduce the total time for the auto-focus process.

In some embodiments, the auto-focusing system can realize both higher focusing accuracy and shorter focusing time due to the use of a multi-sampling process.

In some embodiments, a flicker correction can be implemented using existing hardware and software resources for auto-white balancing, thus providing a low cost flicker correction system and method. In addition, in some embodiments, the flicker correction time can be reduced, because the flicker correction requires no additional process time except existing AWB process time.

The details of one or more embodiments of the invention are set forth in the accompanying drawings and the description below.

DESCRIPTION OF DRAWINGS

FIG. 5 is a diagram of pixel color pattern on an imaging device.

FIG. 6 is a diagram of pixel color pattern on an imaging device.

FIG. 7 is a diagram of pixel color pattern on an imaging device.

FIG. 10 is a graph representative of a pre-gamma correction function.

FIG. 11 is a graphical representation of a filter.

FIG. 12 is a graphical representation of a filter.

FIG. 13 is a graphical representation of a filter.

FIG. 14 is a block diagram of an auto focus system.

DETAILED DESCRIPTION

Figure 1:
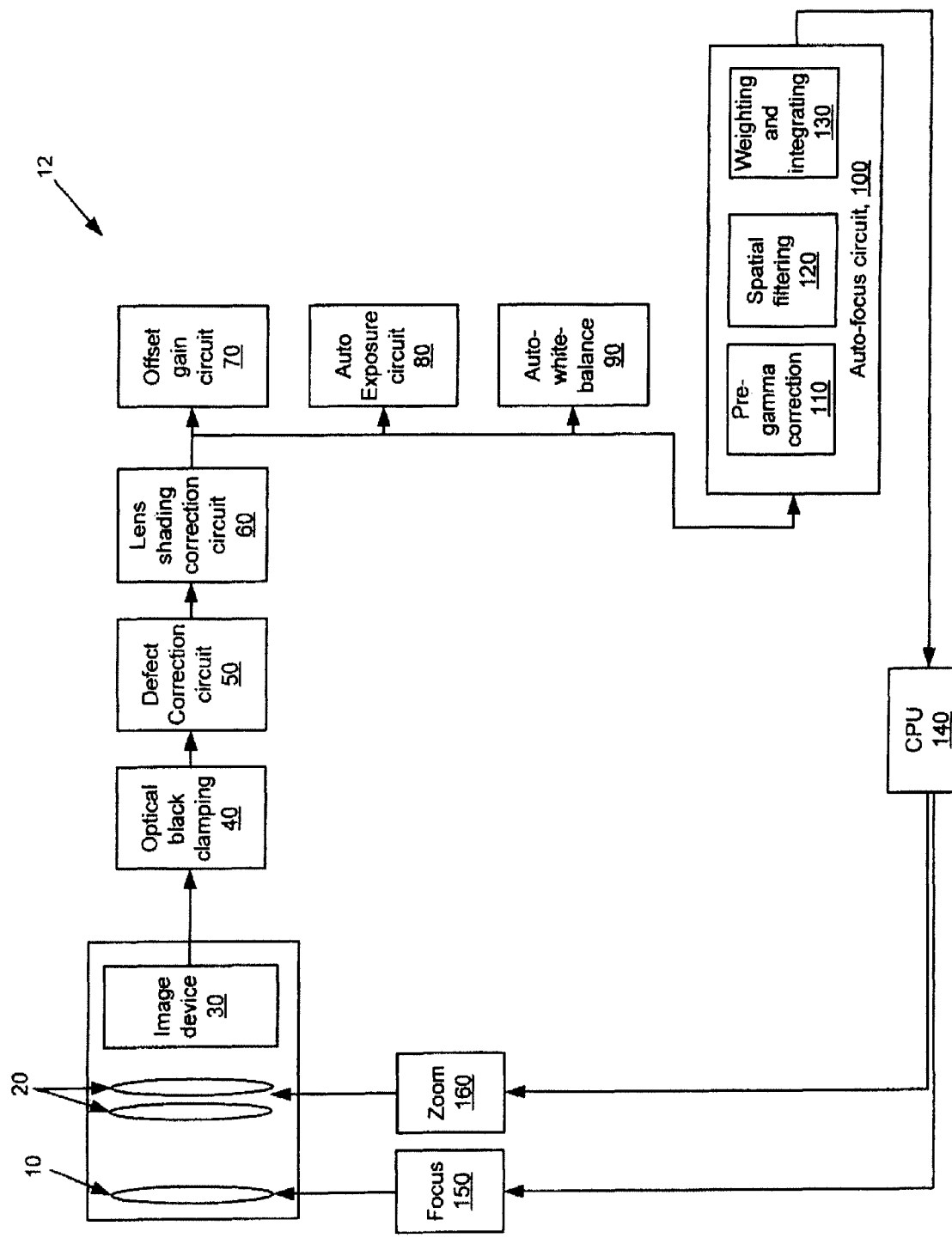
FIG. 1 is a block diagram of an auto-focusing system.

Referring first to FIG. 1, a block diagram of an auto-focusing system 12 that includes a focus lens 10 and zoom lens 20 is shown. Through the focus lens 10 and the zoom lens 20, an optical image is projected on a plurality of pixels on an imaging device 30. The pixels convert the optical image into electrical analog image signals. The electrical analog image signals are converted into digital image signals by an analog digital (A/D) converter (not shown). The digital image signals are fed to an optical black (OB) clamping circuit 40 and clamped to predetermined levels. The clamped digital image signals are fed to a defect correction circuit 50 which electrically corrects the signals. The corrected image signals are fed to a lens shading correction circuit 60 and electrically corrected to image signals without lens shading.

An output signal line of the lens shading correction circuit 60 is divided into multiple lines (e.g., four lines). The first signal line is connected to offset gain circuit 70 which is connected to a video signal processing circuit (not shown). The second signal line is connected to an auto-exposing (AE) circuit 80. The third signal line is connected to an auto-white-balancing (AWB) circuit 90. The fourth signal line is connected to an auto-focusing (AF) circuit 100.

The auto-focusing (AF) circuit 100 includes a pre-gamma correction circuit 110, a spatial filtering circuit 120, and a weighting and integrating circuit 130. The weighting and integrating circuit 130 outputs an auto-focusing signal. The auto-focusing (AF) output signal from the auto-focusing (AF) circuit 100 is fed to CPU 140. The CPU 140 supplies driving signals to drive a focus motor 150 and a zoom motor 160 which move the focus lens 10 and the zoom lens 20 to a focus position.

During an auto-focusing operation, the auto-focusing circuit 100 analyzes signals from the imaging device 30. The auto-focusing circuit changes the distance of focus lens 10 by using motor 150 and observes characteristics of the images at the various focus distances to determine if the image is in focus.

Figure 2:
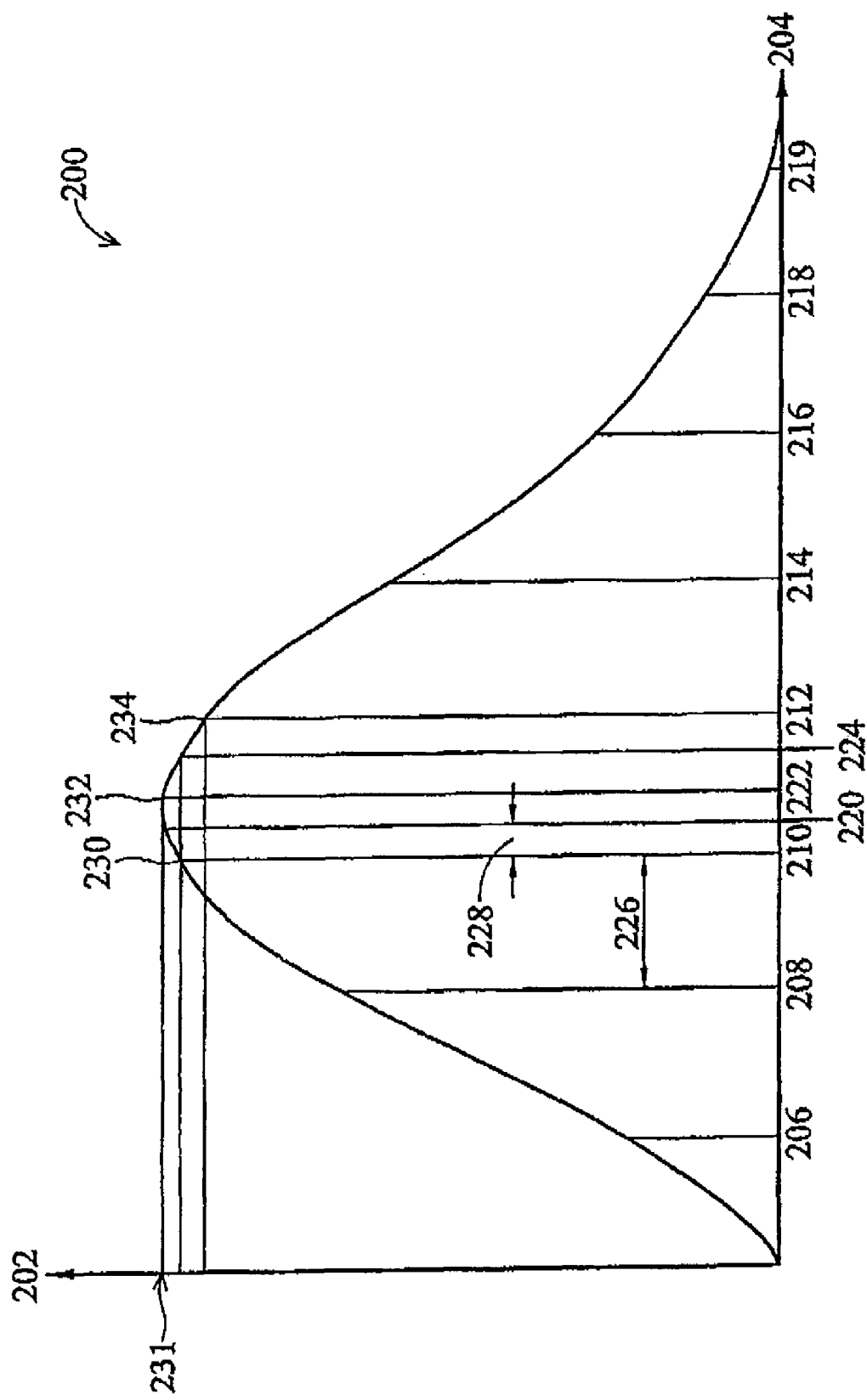
FIG. 2 is a graph of an auto-focusing signal output from auto-focusing circuit.

Referring to FIG. 2, a graph 200 of image samples measured by the auto-focusing circuit 100 as the distance of the focus lens 10 is changed is shown. The horizontal axis 204 is lens moving distance of focus lens 10 and vertical axis 202 is the amplitude of the auto-focus signal output. The amplitude of the auto-focus signal output changes as the distance of the lens changes as the distance of the lens 10 is changed. A larger amplitude signal indicates that the image is more focused than a lower amplitude signal. The auto-focus signal output is maximized at focus position ($X_{AF}$) 232 to focus amplitude ($A_{AF}$) 231.

Figure 3:
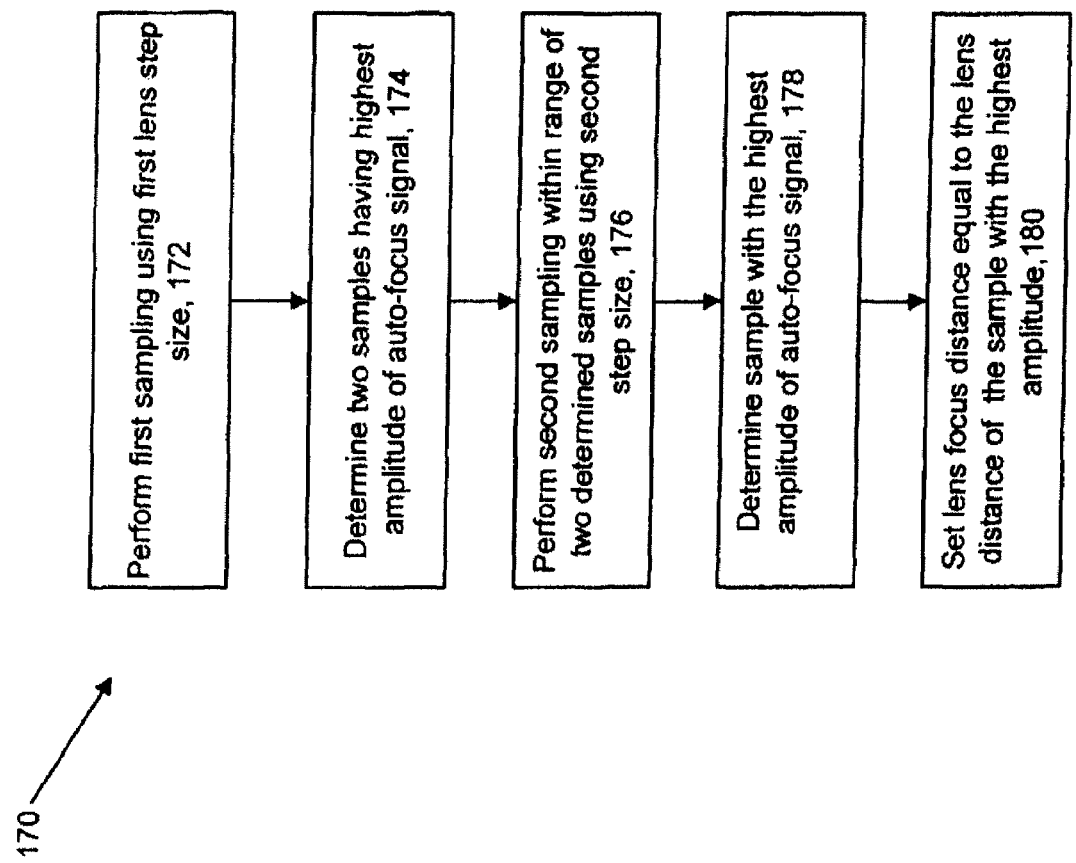
FIG. 3 is a flow chart of an auto-focusing process.

Referring to FIG. 3, a flow chart of an auto-focusing operation that uses a multi-sampling process 170 is shown. Process 170 includes measuring a first set of auto-focus signal outputs from the auto-focus circuit 100 within a first interval of lens moving distances (step 172). The first sampling uses a relatively large step size to generate a rough sampling of the AF signal outputs over a wide range of lens positions. For example, as shown in FIG. 2, the first sampling is performed using a step size indicated by arrow 226 and generates AF amplitudes for the auto-focus signal at lens distances 206, 208, 210, 212, 214, 216, 218, and 219.

Based on the determined amplitudes of the AF signal at the samples lens distances, process 170 determines the two samples have the greatest amplitude of the AF signal (step 174). These two samples provide a narrowed range of lens distances in which the focus amplitude ($A_{AF}$) 231 and focus position ($X_{AF}$) 232 is expected to lie. For example, in FIG. 2, the sampled values 230 and 234 have the greatest amplitudes, therefore, the focus amplitude ($A_{AF}$) 231 is expected to lie between lens distances 210 and 212.

After the first sampling, a second sampling is performed using a smaller step size for the lens using the lens position associated with the selected first maximum value as the starting lens position and using the lens position associated with the selected second maximum value as the end location of the sampled range (step 176). For example, in FIG. 2, the step size for the second sampling is a quarter of the step size for the first sampling (indicated by arrow 228) and begins at location 210 and ends at location 212.

Based on the second sampling, process 170 determines the position where maximum value of the auto-focus signal is present (step 178). Process 170 sets this lens distance as the focus position (step 180). For example, in FIG. 2, point 232 has the highest measured AF value. Therefore, the lens distance 222 corresponding to the AF value 232 will be set as the lens auto focus distance based on the auto-focus process 170.

It is believed that performing multi-sampling can provide higher auto-focusing accuracy and/or can reduce the probability of selecting an undesired signal peak during the auto focus process.

It is also believed that performing multi-sampling can reduce the total time for the auto-focus process. In order to determine the correct distance for the lens during the auto focus process, the lens must be moved to various positions and samples must be taken at the various positions. For example, if an auto focus procedure uses 16 lens positions (as shown in FIG. 2) and 100 ms is needed to move the lens and measure the AF signal at each lens location, then a total of 1.6 seconds would be required to measure the 16 locations. However, using the multi-sampling process described, the first sampling has 8 steps amounting to a time of 800 ms and the second sampling uses four steps amounting to a time of 400 ms. Therefore, the total time for the multi-sampling process is 1.2 seconds as compared to 1.6 seconds for the process that samples all 16 locations. The multi-sampling process maintains the accuracy (e.g., results in the same step size) of the auto-focus while reducing total amount of time needed for the auto focusing.

As described above, the auto-focusing circuit 100 can realize both higher focusing accuracy and shorter focusing time, due to detailed investigation near the focus position by the double sampling.

Although the multi-sampling process described above has been shown using a double-sampling process, the auto-focusing process is not limited to a double-sampling process. Rather, any multi-sampling, such as triple-sampling, quadruple-sampling, or more, that is capable of auto-focusing can be used.

In some embodiments, the auto-focusing system can use one sample having highest amplitude of auto-focus signal instead of two samples, and a second sampling can be performed around this sample.

Referring back to FIG. 1, imaging system 12 can be used in a variety of different lighting conditions. These differing lighting conditions can cause various changes in the imaging. For example, when the imaging system 12 is used outside the sun or natural lighting provides the illumination. In contrast, when the imaging system 12 is used indoors a fluorescent lamp may provide the indoor illumination. The light intensity resulting from illumination provided by a fluorescent lamp periodically changes (e.g., 50 Hz or 60 Hz). This phenomenon is referred to as flicker noise. In some cases, flicker noise can generate undesirable effects in the resulting image such as spatially varying luminance change. Conventional auto-exposure circuits often determine exposure parameters by measuring an average value of light intensity and do not correct the exposure parameters in the flicker noise environment. In system 12, auto-white-balancing (AWB) circuit 90 corrects for flicker noise based on a comparison of the color intensity and a predetermined mapping of the color intensity for various lighting conditions.

Figure 4:
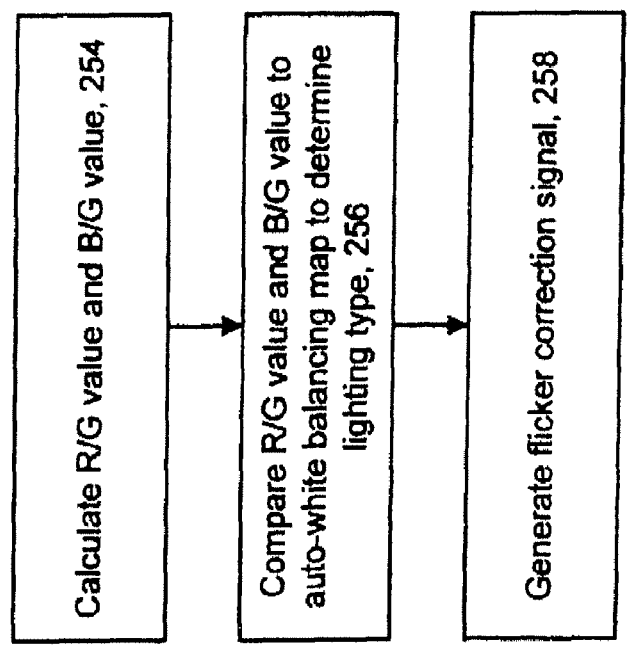
FIG. 4 is a flow chart of a flicker correction process.
Figures 5, 6, 7:
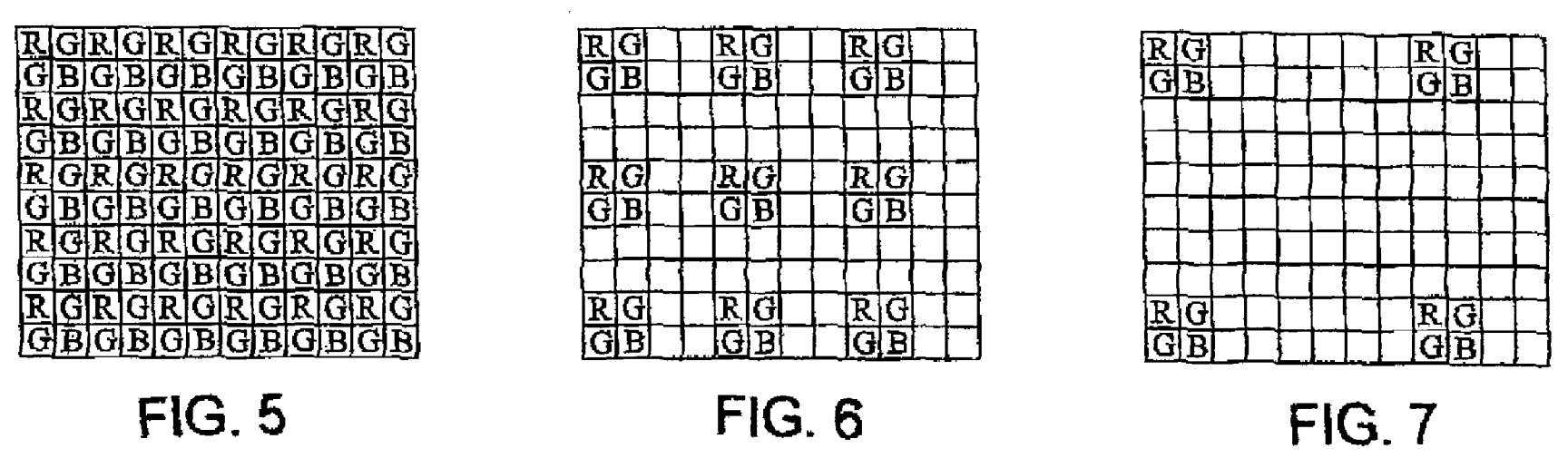

Referring to FIG. 4, a process 250 for AWB mapping to remove flicker noise based on the color intensity of pixels in image is shown. FIG. 5 shows exemplary mappings of color pixels on an imaging device. FIGS. 6 and 7 show sub-sampled pixels for AWB processing. The auto-white-balancing circuit can use all or part of these color pixels on an imaging device. The color mappings include four color signals that are derived from four color pixels adjacent to each other. For example, a set of red, green, blue, and green (RGBG) pixels in a predetermined area on the imaging device can be used.

Process 250 calculates a value for R/G and B/G (step 254). In some embodiments, the green (G) signal is converted to 1/G signal using predetermined conversion table. The R signal and the B signal are multiplied with the 1/G signal to obtain the R/G signal and B/G signal. In other embodiments, the system divides the red signal by the green signal and the blue signal by the green signal without first calculating 1/G.

Figure 8:
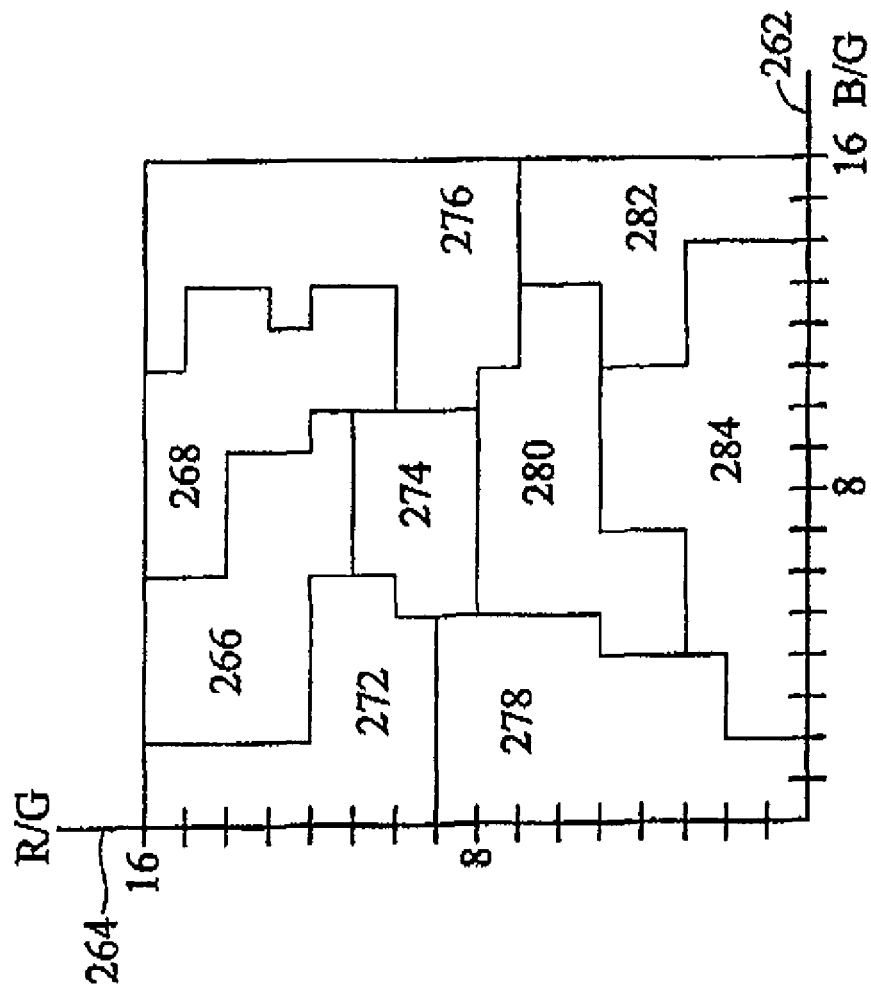
FIG. 8 is a graph representative of an auto-white balancing chart.

The calculated R/G can B/G values are compared to a predetermined auto-white balancing (AWB) map to determine the lighting type (step 256). FIG. 8 shows an exemplary AWB map 260 in which the B/G value is graphed on the x-axis 262 and the R/G value is graphed on the y-axis 264. AWB map 260 is divided into multiple regions (e.g., regions 266, 268, 272, 274, 276, 278, and 280) corresponding to various lighting conditions. The regions are determined based on scene information for images taken in various different lighting conditions. For example, region 280 is common scene, region 284 is indoor scene, regions 266, 268, 272, 274, and 278 are fluorescent lamp scenes and region 276 is an outdoor scene. The number of scenes and/or the shape of the corresponding AWB regions can vary as desired. The AWB map can be determined experimentally or can be calculated based on previously obtained image information. By comparing the R/G signal (x-axis 262) and B/G signal (y-axis 264)

with the AWB map, the system determines whether fluorescent lamp illumination is used. If so, system 90 generates a flicker correction signal and modifies the exposure parameters according to the flicker correction signal (step 258). For example, if the analyzed image corresponds to a fluorescent lamp illumination the shutter speed can be increased to be greater than 10 ms to reduce or eliminate the flicker from the resulting image.

While in the above embodiment, a single calculation of R/G and B/G was used to determine the lighting conditions based on the AWB map, multiple calculations can be used. In some embodiments, the system calculates multiple R/G and B/G values from various portions of the image. These values are averaged to determine an average R/G and an average B/G value to be used to determine the lighting condition from the AWB mapping.

In some embodiments, the flicker correction described above can be implemented using existing hardware and software resources, thus providing a low cost flicker correction system and method. Furthermore, the flicker correction time can be significantly reduced, because it requires no additional process time except existing AWB process time.

Referring back to FIG. 1, the image signals derived from the pixels on the imaging device 30 may include noise which influences the accuracy of the auto focus operation for the imaging device 30. For example, if there is a low luminosity in the image there may be low auto focus accuracy in comparison to a high luminosity image. Therefore, noise included in the low luminosity image may have a greater effect on the focusing of the system. In order to reduce the effect of the luminosity level on the auto-focusing operation, the input signal can be modified by a pre-gamma correction function. Auto focus circuit 100 provides pre-gamma correction to the image signal to reduce the influence of the noise in low level lighting on the auto focus operation.

Auto-focusing circuit 100 in image-capturing system 12 performs pre-gamma correction to image signals derived from predetermined pixels on the imaging device 30 and performs signal processing on the pre-gamma-corrected image signals. The signal processing of the pre-gamma-corrected image signals can include spatial filtering of the image signals, weighting and integrating the filtered signals, and outputting the weighted and integrated signals as auto-focusing signals. The pre-gamma correction is performed to multiple signals sampled at predetermined intervals.

Figure 9:
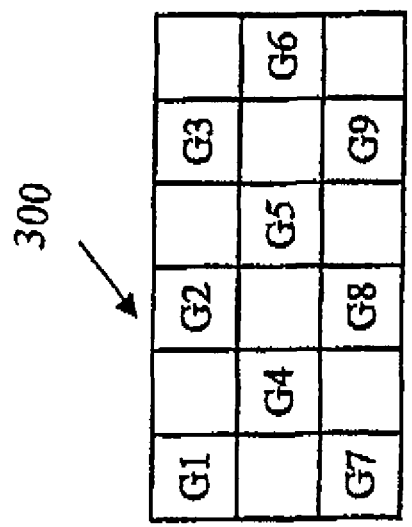
FIG. 9 is a diagram of G pixel pattern on an imaging device.

Referring to FIG. 9 which shows an example of image signals derived from predetermined pixels on the imaging device 30, the pixels on imaging device 30 represent a plurality of green (G) pixels at predetermined positions on the imaging device 30.

Referring to FIG. 10, an exemplary pre-gamma correction function 310 for the auto-focusing system is shown. The pre-gamma correction is performed on multiple signals sampled at predetermined intervals using function 310. In the graph of the pre-gamma function 310, the x-axis represents the input signal luminosity and the y-axis represents the output signal that is based on a mathematical transformation of the input signal. The pre-gamma function includes multiple regions 316, 318, 320, 322, 324, 326, 328, and 330 having differing slopes resulting in an "S-shaped" function. The slope of each region is determined based on the slope of a line formed between two endpoints for the region. The slope can also be determines based on a derivative of the "s-shaped" function at a particular location. The slope of the regions having a relatively low luminosity (e.g., regions 316 and 318) and the regions having a relatively high luminosity (e.g., regions 328 and 330) is less than the slope of the regions having a moderate luminosity (e.g., regions 322, 324, and 326).

In operation, a value of an input signal (e.g., the input shown in FIG. 9) is multiplied by the slope of the pre-gamma function for the associated luminosity level. Since the slope of the pre-gamma signal is lower for signal inputs having relatively low or relatively high luminosities, high frequency component of the low and high luminosity signals in the image are reduced. For example, if the signal is at a low luminosity level at input, differential of the signal will be lower relative to the other signals after calculating the pre-gamma correction using function 310.

After performing the pre-gamma correction, additional filtering may be performed in the auto focusing circuit 100. FIGS. 11, 12, and 13 show graphical representations of Lapracian filtering, vertical differential filtering, and lateral differential filtering respectively. The filtering can be used to emphasize edge components of the image.

FIG. 14 shows a weighting and integrating circuit 130 in the auto-focusing circuit 100. The image signals (e.g., represented by arrow 109) derived from predetermined pixels on imaging device are input into the pre-gamma correction circuit 110. The pre-gamma correction on the image signals 109. The pre-gamma correction is based on the S-shaped function 310. The pre-gamma correction circuit 110 multiplies the input signals by the slope of the pre-gamma function 310 in the appropriate luminosity range. The pre-gamma-corrected image signals (e.g., represented by arrow 134) are fed to the spatial filtering circuit 120 which emphasizes the edge components of the image using a filter such as those shown in FIGS. 11, 12, and 13. The filtered image signals are input into the weighting and integrating circuit 130 which averages the filtered image signals to generate an average weighted signal. The weighted and integrated image signals are fed to the CPU 140.

The CPU 140 receives the weighted and integrated image signals (also referred to as the auto-focusing signal) and produces the driving signal to drive the focus motor 150 based on the received signal. The focus motor 150 moves the focus lens 10 to the focus position. For example, if the auto focus value is high, the value indicates a high frequency component. In general, the high frequency component will be greater if the image is in focus; and if the image is not in focus then the high frequency component will be small. The magnitude of the high-frequency component indicates to the drive motor the type of correction that should be made to the lens distance to correct the focusing of the image.

As described above, the auto-focusing circuit 100 can realize both higher focusing accuracy and shorter focusing time.

Finally, although the present invention has been particularly shown and described above, the present invention is not so limited. For instance, the present invention is not only limited to the signal processing to the pre-gamma-corrected image signals shown and described. Rather, any signal processing that is capable of auto-focusing can be used. Therefore, these and other changes in form and details may be made to the preferred embodiments without departing from the true spirit and scope of the invention as defined by the appended claims.

Accordingly, other embodiments are within the scope of the following claims:

What is claimed is:

1. A method for determining an exposure parameter based on an illumination condition, the method comprising:
    calculating a red divided by green (R/G) value;
    calculating a blue divided by green (B/G) value; and comparing the R/G and B/G values to a predetermined auto-white balancing map to determine the exposure parameter.

2. The method of claim 1, further comprising selecting a red signal, a blue signal, a first green signal, and a second green signal in a predetermined area of an imaging device.

3. The method of claim 2, wherein the predetermined area comprises four adjacent pixels.

4. The method of claim 2, wherein:
calculating the R/G value further comprises:
determining a first 1/G value based on the first green signal; and
multiplying the red signal by the first 1/G value; and
calculating the B/G value further comprises:
determining a second 1/G value based on the second green signal; and
multiplying the blue signal by the second 1/G value.

5. The method of claim 1, wherein the auto-white balancing map comprises a plurality of regions corresponding the different illumination conditions.

6. The method of claim 5, wherein the auto-white balancing map includes a region corresponding to fluorescent lamp illumination.

7. The method of claim 6, further comprising generating a flicker correction signal based on the determined exposure parameter if the R/G and B/G values correspond to the region corresponding to fluorescent lamp illumination.

8. The method of claim 1, wherein the exposure parameter is a shutter speed.

9. The method of claim 1, wherein calculating the R/G value and calculating the B/G value further comprises:

selecting a red signal, a blue signal, a first green signal, and a second green signal in a plurality of predetermined areas of an imaging device;
calculating a plurality of intermediate R/G values and intermediate B/G values based on the selected red signal, the selected blue signal, the selected first green signal, and the selected second green signal in the plurality of predetermined areas;
averaging the calculated intermediate R/G values to generate the R/G value; and
averaging the calculated intermediate B/G values to generate the B/G value.

10. An image-capturing system comprising:
a circuit configured to:
calculate a red divided by green (R/G) value;
calculate a blue divided by green (B/G) value; and
compare the R/G and B/G values to a predetermined auto-white balancing map to determine an exposure parameter.

11. The image-capturing system of claim 10, wherein the auto-white balancing map comprises a plurality of regions corresponding the different illumination conditions.

12. The image-capturing system of claim 11, wherein the auto-white balancing map includes a region corresponding to fluorescent lamp illumination and the circuit is further configured to generate a flicker correction signal based on the determined exposure parameter if the R/G and B/G values correspond to the region corresponding to fluorescent lamp illumination.

* * * * *